June 25, 1940.                O. B. GOLDKAMP                2,205,774
                                  VALVE
                            Filed May 31, 1938
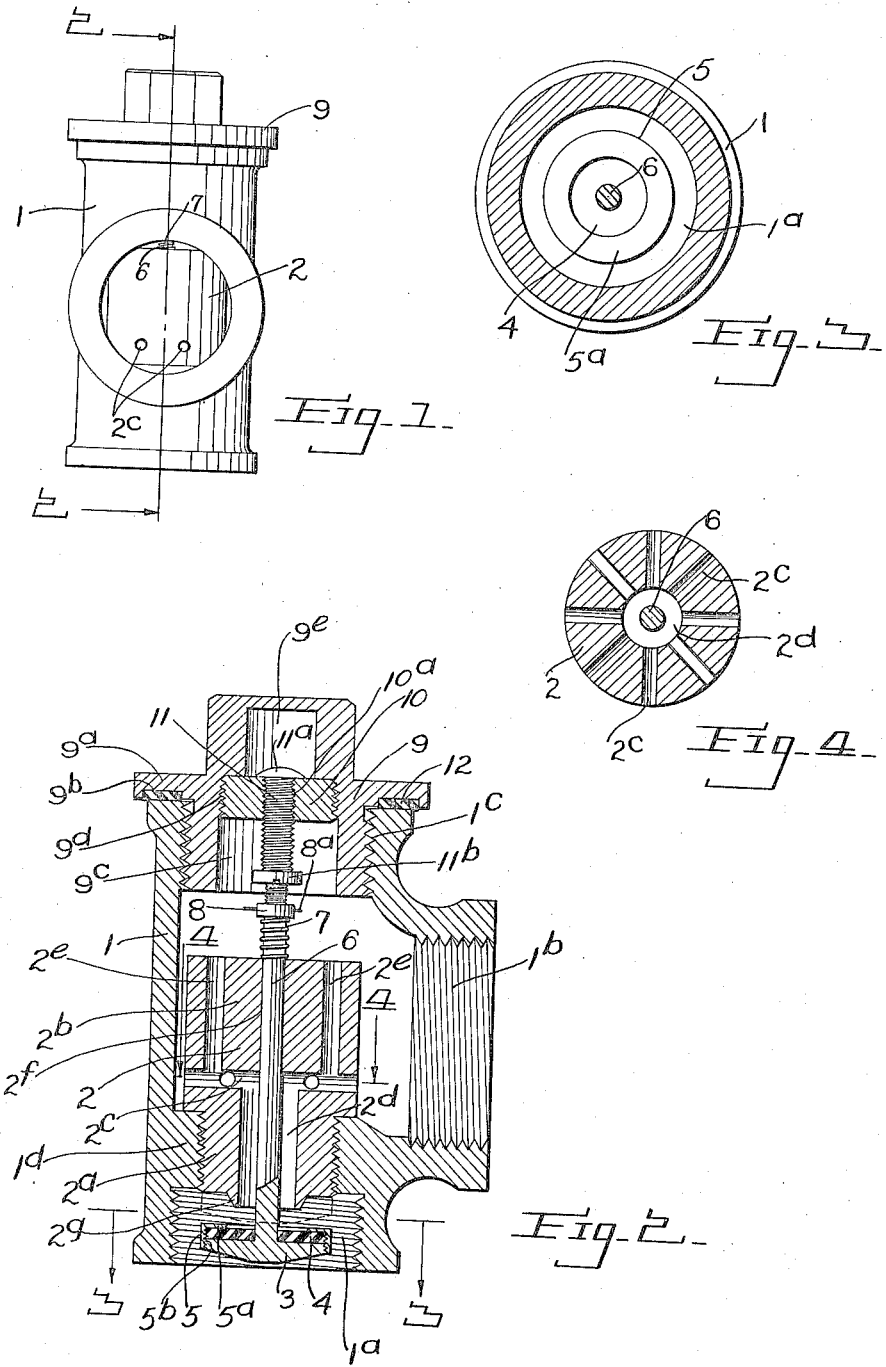
INVENTOR.
BY  Otto B. Goldkamp
    A.B.Bowman
        ATTORNEY.

Patented June 25, 1940

2,205,774

UNITED STATES PATENT OFFICE 2,205,774

VALVE

Otto B. Goldkamp, San Diego, Calif., assignor of one-half to San Diego Consolidated Gas and Electric Company, San Diego, Calif., a corporation of California Application May 31, 1938, Serial No. 210,912

2 Claims. (Cl. 251—137)

My invention relates to valves, more particularly adapted for use for meter shut off valves for controlling the flow of fluid from the meter, particularly gas. However, it will be noted that this valve may be used for other purposes, and the objects of my invention are:

First, to provide a valve for meter shut off purposes or the like which may be adjusted so that the valve will be closed and remain closed and which cannot be opened from the outside;

Second, to provide a valve of this class which may be adjusted to regulate the flow of fluid therethrough, which flow may be continuous;

Third, to provide a valve of this class which must be partially disassembled in order to adjust the same, but is easy to partially disassemble;

Fourth, to provide a valve of this class which is easily disassembled throughout for the purpose of repairs or replacements;

Fifth, to provide a valve of this class that is so constructed that it will not leak;

Sixth, to provide a valve of this class that is very simple and economical of construction, easy to adjust, efficient in its action, and will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application in which:

Figure 1 is a side elevational view of my valve looking toward the outlet side; Fig. 2 is a longitudinal sectional view on an enlarged scale taken from the line 2—2 of Fig. 1 and showing some of the parts and portions in elevation to facilitate the illustration; Fig. 3 is a transverse sectional view taken from the line 3—3 of Fig. 2 and Fig. 4 is a transverse sectional view taken from the line 4—4 of Fig. 2.

Similar characters of reference refer to similar parts and portions throughout the several views of the drawing:

The casing member 1, valve guide 2, valve member 3, valve gasket 4, valve gasket retainer 5, valve stem 6, valve stem spring 7, valve stem collar 8, plugs 9 and 10, adjusting screw 11, and gasket 12 constitute the principal parts and portions of my valve.

The casing 1 is similar in form to the ordinary T-fitting and is provided with an inlet opening 1a which is internally screw threaded adapted to fit an inlet pipe and with an outlet opening in the side at 1b which is internally threaded adapted to receive an outlet pipe from said valve and it is provided at the opposite end from the inlet opening 1a with a plug receiving opening 1c which is internally threaded adapted to receive the plug 9. This casing 1 is also provided with a reduced internally threaded portion 1d in which is screw threaded the lower end 2a of the valve guide 2. This valve guide 2 is provided with an enlarged upper end portion 2b with ports 2c which radiate outwardly from the central portion to provide a passage for the fluid passing through the valve. These ports 2c communicate with a central port 2d which extends centrally from the lower side of the portion 2a into the portion 2b and communicates with the ports 2c at its upper end, and communicating with some of the ports 2c and extending upwardly are two ports 2e which serve as ports and also serve as holes for a spanner wrench for turning the member 2 when it is desired to remove or replace the same. This portion 2b is provided with a central bore 2f which serves as a guide for the valve stem 6 which is reciprocally mounted therein. This valve stem is provided on its lower extended end with a valve member 3 shown best in Fig. 2 of the drawing which is provided with a flat upper surface upon which is mounted a gasket 4 around the valve stem 6 and adapted to engage a downwardly extending valve seat portion 2g on the lower extended end of the member 2 when the valve member 3 is raised upwardly. This gasket 4 is supported at its periphery by means of the valve gasket retainer 5 which is provided with a ledge 5a which extends inwardly over the gasket periphery some distance and is provided with an internally threaded portion 5b which is screw threaded on the periphery of the valve member 3 all as shown best in Fig. 2 of the drawing. Screw threaded on the upper end of the valve stem 6 is a collar 8 which is secured thereon by means of a cotter pin 8a, the screw threaded portion of the stem extending upwardly some distance above the collar 8 as shown best in Fig. 2 of the drawing. Interposed between this collar 8 and the upper end of the member 2 is a compression spring 7 which tends to hold the valve stem, and therefore the valve upwardly against the valve seat 2g at all times. The plug 9 is provided with an outwardly flanged portion 9a which is provided with an annular recess 9b in its lower side in which is mounted a gasket 12 which is adapted to seat against the upper edge of the casing 1 for providing a tight fit between the plug 9 and the casing 1. This plug 9 is provided with a large bore 9c in its lower end which is provided with an internally threaded portion 9d at the upper end of said bore in which is screw threaded a plug 10, and this plug 10 is provided with a central threaded hole 10a. Mounted in this opening 10a is the adjusting screw 11 which is provided with a rounded head 11a on its upper end and is adapted to be shifted in the plug 10 in the chamber 9e in the plug member 9. It is provided on its lower end with a head 11b which is slotted to receive a screw driver and this adjusting screw 11 is sufficient length to provide for its shifting longitudinally in the plug 10 for considerable distance and it will be noted that this head 11b is adapted to engage the upper end of the valve stem 6 when it is desired to secure the valve in open position as shown in Fig. 2 of the drawing or by shifting this adjusting screw 11 in the plug member 10 the distance between the gasket 3 and the seat 2g may be adjusted to provide for regulated flow of fluid through the valve, it being noted that the fluid passes around the valve 3 and between the seat 2g and the gasket 4 upwardly through the port 2d and is distributed through the ports 2c and 2e and out through the outlet 1b. If it is desired to close the flow entirely, the adjusting screw 11 is screwed upwardly so that the head 11b does not engage the upper end of the valve stem 6 when the valve is seated.

It will be noted that in order to adjust the adjusting screw 11 in the plug 10 and thereby adjust the valve, the plug 9 is removed and a screw driver applied to the slot in the head 11b of said screw and the screw adjusted to a proper position for the valve. Then the plug is again replaced and the valve is ready for operation, it being noted that when the plug 9 is removed the valve is always closed and therefore no leakage of gas is necessary.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a meter shutoff valve of the class described, the combination of a valve casing provided with three internally threaded openings therein, one opening an inlet opening at one end, another an outlet opening at one side and the other a plug receiving opening in axial alignment with the axial alignment of the inlet opening, a valve reciprocally mounted in the inlet opening provided with a stem extending toward the plug opening, a spring on said stem tending to close said valve, a hollow plug mounted in the plug opening, a second plug mounted in said hollow plug and an adjusting screw shiftably mounted in said second plug provided with a screw driver receiving slot in its inwardly extending end.

2. In a meter shutoff valve of the class described, the combination of a valve casing provided with three internally threaded openings therein, one opening an inlet opening at one end, another an outlet opening at one side and the other a plug receiving opening in axial alignment with the axial alignment of the inlet opening, a valve reciprocally mounted in the inlet opening provided with a stem extending toward the plug opening, a spring on said stem tending to close said valve, a hollow plug mounted in the plug opening, a second plug mounted in said hollow plug and an adjusting screw shiftably mounted in said second plug provided with a screw driver receiving slot in its inwardly extending end, said first mentioned plug wholly enclosing and concealing said second plug and adjusting screw.

OTTO B. GOLDKAMP.